United States Patent
Posselius et al.

(10) Patent No.: US 7,748,206 B1
(45) Date of Patent: Jul. 6, 2010

(54) FRUIT HARVESTER WITH SYSTEM AND METHOD FOR DETECTING AND REDUCING FORCES EXERTED AGAINST RIGID STANDING OBJECTS

(75) Inventors: John H. Posselius, Ephrata, PA (US); David W. Larson, Maple Park, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/401,180

(22) Filed: Mar. 10, 2009

(51) Int. Cl.
*A01D 46/00* (2006.01)
(52) U.S. Cl. .................................................. 56/328.1
(58) Field of Classification Search ................ 56/328.1, 56/329, 330, DIG. 2, 10.2 G
See application file for complete search history.

(56) References Cited

U.S. PATENT DOCUMENTS

| | | | | |
|---|---|---|---|---|
| 3,184,908 A | * | 5/1965 | Rust ............................ 56/330 |
| 3,563,016 A | | 2/1971 | Tolochko et al. |
| 3,972,156 A | | 8/1976 | Bennett, Jr. et al. |
| 4,172,352 A | * | 10/1979 | McCarthy et al. .......... 56/340.1 |
| 4,758,788 A | | 7/1988 | Weiss et al. |
| 4,769,979 A | * | 9/1988 | Merant ........................ 56/330 |
| 5,067,314 A | * | 11/1991 | Burke .......................... 56/330 |
| 5,339,612 A | * | 8/1994 | Scott ........................... 56/330 |
| 5,444,966 A | | 8/1995 | Strosser et al. |
| 5,495,708 A | * | 3/1996 | Scott et al. ................... 56/329 |
| 5,642,610 A | * | 7/1997 | Dupon et al. ............... 56/340.1 |
| 5,666,795 A | * | 9/1997 | Wilkinson .................. 56/328.1 |
| 5,901,534 A | | 5/1999 | Weiss et al. |
| 5,921,074 A | * | 7/1999 | Scott et al. ................... 56/330 |
| 5,956,933 A | * | 9/1999 | Heard .......................... 56/329 |
| 6,145,291 A | * | 11/2000 | Jarmain ....................... 56/330 |
| 6,658,834 B1 | | 12/2003 | Mayo |
| 6,854,254 B2 | | 2/2005 | Mérant |
| 6,901,731 B2 | | 6/2005 | Scott et al. |
| 6,945,019 B1 | * | 9/2005 | Sonnek et al. ............ 56/10.2 F |
| 6,952,914 B2 | | 10/2005 | Zehavi et al. |
| 7,064,540 B2 | | 6/2006 | Brune et al. |
| 2005/0034441 A1 | * | 2/2005 | Porta et al. ................ 56/328.1 |
| 2005/0039431 A1 | * | 2/2005 | Schloesser et al. ........ 56/340.1 |
| 2005/0252190 A1 | * | 11/2005 | Scott et al. ................ 56/340.1 |
| 2005/0279073 A1 | | 12/2005 | Clauss et al. |
| 2006/0174600 A1 | | 8/2006 | Behnke et al. |
| 2007/0012018 A1 | * | 1/2007 | Pellenc et al. ............ 56/328.1 |
| 2007/0056257 A1 | | 3/2007 | Desnijder et al. |
| 2008/0078153 A1 | | 4/2008 | Schafer |

FOREIGN PATENT DOCUMENTS

DE 19912407 9/2000

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

The harvester incorporates a system and method for detecting rigid standing objects such as reinforced posts in the harvester's path and responsively reducing forces exerted by harvesting apparatus of the harvester against the object. The harvesting apparatus including at least one member movable in contact with the plants by a drive for exerting forces for detaching the fruit. At least one sensor is disposed and operable for sensing a rigid object in advance of being contacted by the member or members. In response, the movements of the member or members will be reduced or altered at an appropriate time and duration for reducing forces exerted against the object while protecting harvest yield.

22 Claims, 5 Drawing Sheets

FRUIT HARVESTER WITH SYSTEM AND METHOD FOR DETECTING AND REDUCING FORCES EXERTED AGAINST RIGID STANDING OBJECTS

TECHNICAL FIELD

The present invention relates to a harvester for fruits such as grapes, berries and the like, and more particularly, to a system and method for detecting rigid standing objects, such as metal or metal reinforced posts and the like, in the path of harvesting apparatus of the harvester, and adapting or altering the operation of the harvesting apparatus for passage about the standing object in a manner to reduce or minimize forces exerted thereagainst, and thus potential wear and/or damage, noise, and the like, which would be otherwise caused by forceable contact with the object.

BACKGROUND ART

It is well known to harvest fruit, such as, but not limited to, grapes, and berries such as blackcurrants, gooseberries or raspberries, olives and coffee beans, using an automatic harvester, which can be self-propelled or tractor driven. Reference in regard to modern self-propelled harvesting machines, Mérant U.S. Pat. No. 6,854,254, issued Feb. 15, 2005 to CNH France S.A., and entitled Harvesting Device With Disengageable Shaker Members For A Fruit Harvesting Machine.

Fruit harvesters, particularly for grapes, such as the harvester disclosed in the above-identified Mérant patent, typically utilize harvesting apparatus configured to exert forces against the vines bearing the fruit, in this example, by shaking them using a generally horizontal sinusoidal or pseudo-sinusoidal movement of a selected amplitude and frequency selected for detaching the fruit or the bunches of the fruit. This forceable movement is typically communicated to the whole of the vine by movable shaker members disposed to operate either on the stocks or the stems of the vines or on the vegetation, i.e. on the fruit-bearing area of the vine, depending on the type and number of shaker members used. As an example, the percentage of the bunches of grapes and/or individual grapes that are detached from the vine is typically a function of the number and amplitude of the oscillations to which a given bunch of grapes is subjected. The more vigorously a given bunch of grapes is shaken, and the greater the number of times it is shaken, the greater the chance of the bunch or its individual grapes being detached from the vine. The number and the amplitude of the oscillations to which a given bunch of grapes is subjected depend on various parameters for which suitable values can be selected, in particular the amplitude and the frequency of the output of the drive mechanism associated with the shaker members, the length of the active area of said shaker members, their stiffness or flexibility, and the rate at which the machine moves forward, and on other factors that are imposed by the vine itself, in particular how it is trained, its shape and the resistance that it has to the movement of the shaker members. As exemplified by the Mérant patent, the shaker members can be compiled in assemblies supported in face-to-face relation on opposite sides of a straddling frame defining an elongate passage therethrough.

In operation, the straddling frame is driven in straddling relation along a row of trees, vines or other plants carrying the fruit to be harvested, which pass through the passage. As this occurs, the shaker assemblies are oscillated by their drive mechanism in a cooperative manner, with sufficient forcefulness to correspondingly flex while in contact with the plants, to detach the grapes, berries, or other fruit. The detached fruit then falls into baskets of conveyors below the shaker assemblies.

A problem that has been encountered when harvesting fruits using an automated harvester such as described above, is that in many instances the rows of fruit plants include upstanding rigid, unyielding objects which are likewise contacted by the shaker members of the harvesting apparatus. Such rigid upstanding objects can include, for instance, reinforced concrete and metal posts. In particular, vines bearing grapes are often supported on trellises or wires supported by upstanding posts, poles or pipes of hard, unyielding material such as reinforced concrete containing metal wires and/or bars, at spaced intervals along the rows. The forces generated by such shaking or vibratory contact with such rigid unyielding objects, in combination with the effects of a rough surface texture thereof, e.g., weathered concrete, pitted metal, and the shape, of the objects, e.g., angular such as rectangular or octagonal, over time, results in damage to, and/or excessive wear of, the harvesting apparatus, particularly the shaker members, as well as possible damage to the rigid objects. Such contacts can also result in undesirable noise, and vibration which can be transmitted to the operator platform or cabin of the harvester.

Thus, what is sought is some manner of overcoming one or more of the problems and/or shortcomings set forth above.

SUMMARY OF THE INVENTION

According to the invention, what is disclosed is a harvester for fruits such as grapes, berries and the like, incorporating a system and method for detecting standing rigid, unyielding or potentially damaging objects, particularly metal or metal reinforced posts, poles, and the like, in the path of harvesting apparatus of the harvester, and adapting the operation of the harvesting apparatus for passage about the standing objects, in a manner for overcoming one or more of the problems and shortcomings set forth above, namely, reducing forces exerted thereagainst for minimizing potential wear and/or damage, noise, and the like.

According to a preferred aspect of the invention, the exemplary harvester includes a straddling frame or gantry supporting harvesting apparatus including at least one movable member such as, but not limited to, a shaker member or assembly, disposed beside and defining a passage extending through the frame configured for successively receiving a row of fruit bearing plants. The harvester includes at least one drive connected in driving relation to the at least one movable member, and automatically operable for moving the member in a forceable, e.g., shaking, manner for exerting forces against objects located in the passage, e.g., fruit plants, for detaching the fruit, most preferably, so as to fall, for collection by collecting apparatus of the harvester.

The harvester additionally includes at least one sensor or detector, which operates to sense any upstanding rigid object, e.g., a metal or metal reinforced post, entering, or about to enter, the passage. This can be as the object is still located outwardly of an inlet opening in connection with the passage, or as it is located in the inlet opening or an initial portion or region of the passage, but preferably before being contacted in a significantly forceful, e.g., shaking, manner by the harvesting apparatus.

In operation, responsive to the sensing of entry of a rigid upstanding object into the passage, the movements of the at least one movable member will preferably be reduced or altered when the object is within the passage adjacent to a predetermined portion of the movable member which would otherwise exert a potentially damaging force against the object, so as to substantially reduce or minimize damage to the movable member or members. This can also reduce or minimize damage to the rigid object and reduce the noise and vibration transmitted to the operator platform or cabin of the harvester. Such reductions or alterations of the movements can comprise, for instance, altering the connection of the drive to the movable member or members to allow contact with the object to push the member or members sidewardly outwardly relative to the passage, away from a center region thereof, or operating the drive in a manner for reducing the forces, such as reversing the drive, idling the drive, or other suitable action. As an example, a clutch can be used for connecting a motive device, e.g., a fluid or electric motor, belt, chain, or other drive, to the at least one member, and the clutch can be temporarily slipped or disengaged for the appropriate time such that the member can be compliantly or passively moved past the object. As another example, a fluid motor, if used, can be destroked at the appropriate time to provide the compliance. If the movements are oscillations, the oscillations can be stopped, partially reversed, or the amplitude and/or or frequency thereof can be reduced or altered to achieve the desired force reducing effect, e.g., passage about the object in a minimally forceful manner. This also can be achieved, for instance, by the temporary slipping or disengaging of the drive from the member or members, or appropriately controlling the drive, e.g., slowing speed, such that the movable members are positioned for exerting minimum or near minimum forces against the object during passage thereabout. As an alternative, one or more of the movable member or members can be positively moved or retracted away from the object while in proximity thereto, for reducing the forceable contact therewith.

According to another preferred aspect of the invention, the at least one member of the harvesting apparatus, e.g., shaker assembly, can be located on both opposite sides of the passage, and during normal operation can be oscillated in a phased relation generally horizontally. Then, responsive to the sensing of entry of an upstanding rigid object, the oscillations or flexures of the member or members can be reduced, at an appropriate time during the movement thereof about the object.

According to another preferred aspect of the invention, the member or members can comprise a flexible rod or rods, which are alternatingly flexed and relaxed, e.g., by the oscillating movements. In one embodiment of the invention, the reductions or relaxations will occur only when a region of maximum flexure of the rods will occur in close proximity to the rigid object, so as to minimize any effect on harvest yield.

According to another preferred aspect of the invention, for detecting upstanding rigid objects partially or entirely of metal, such as metal posts, and metal reinforced concrete posts, the sensor can include a metal detector or detectors. Alternatively, or additionally, sonic, e.g., ultrasonic, imaging, or radar type sensors, operable for discerning upstanding rigid objects such as posts and the like, from trunks, branches, vines, and other portions of the plants from which the fruit is being harvested, can be used. Additionally, to facilitate sensing of non-metallic standing objects by a metal detector, metal elements can be attached to the objects at an appropriate location or locations. For instance a metallic tape, sheet, or marker could be used. As a preferred location or locations for the sensor or sensors, they can be advantageously positioned adjacent to an inlet opening in connection with the passage. The sensor or sensors can also be configured and located, e.g., at a lower position, to minimize false detections of higher located trellis and guy wires, and other non-problematic metallic objects. Additionally, the sensor or sensors can be in known relation to a predetermined portion or aspect of the at least one member which exerts the greatest forces, e.g., region of greatest flexure of the rod or rods, such that the time that an upstanding rigid object will be in position to be most forcibly contacted thereby can be determined, and the movements thereof reduced or altered to reduce the forces exerted against the object, as the member or members passes it.

BRIEF DESCRIPTION OF THE DRAWINGS

The invention will now be described further, by way of example, with reference to the accompanying drawings, in that.

DETAILED DESCRIPTION OF THE INVENTION

Figure 1:
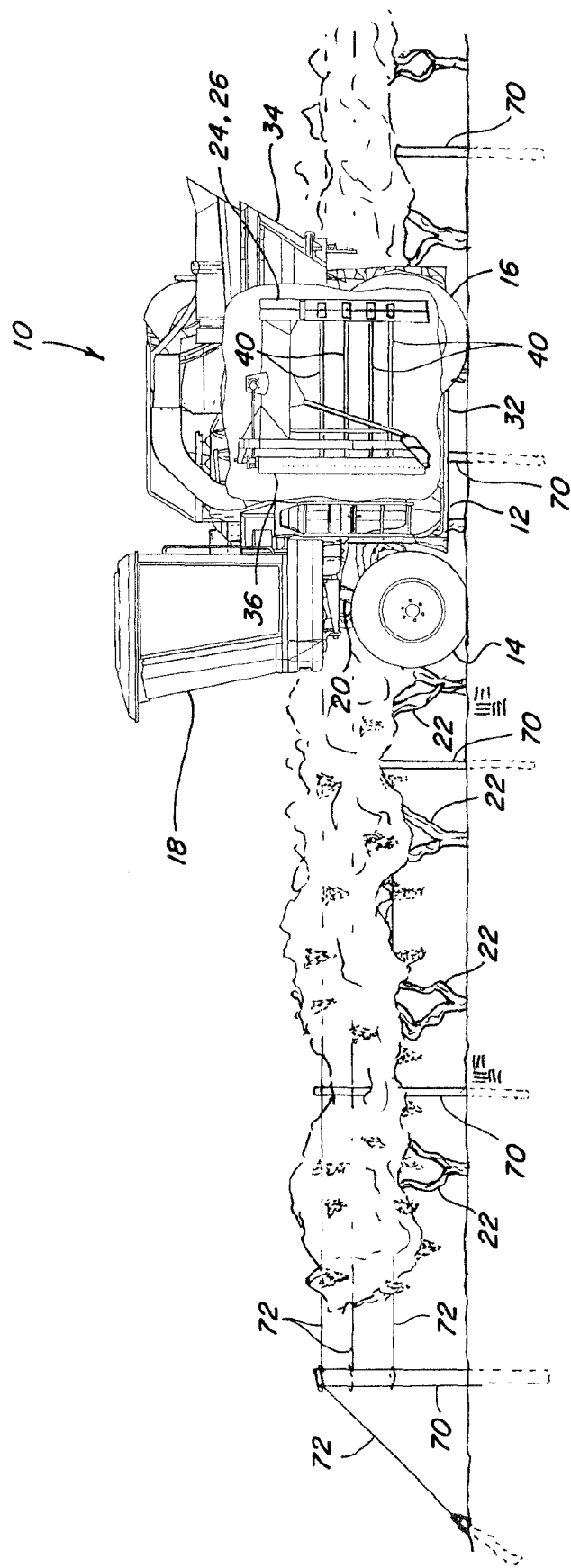
FIG. 1 is a side view, partly cut away, showing a fruit harvester equipped with harvesting apparatus incorporating a system and method of the invention for detecting and handling upstanding rigid objects, shown in an operating mode moving along a trellis supporting a row of grape plants, supported by spaced posts.
Figure 2:
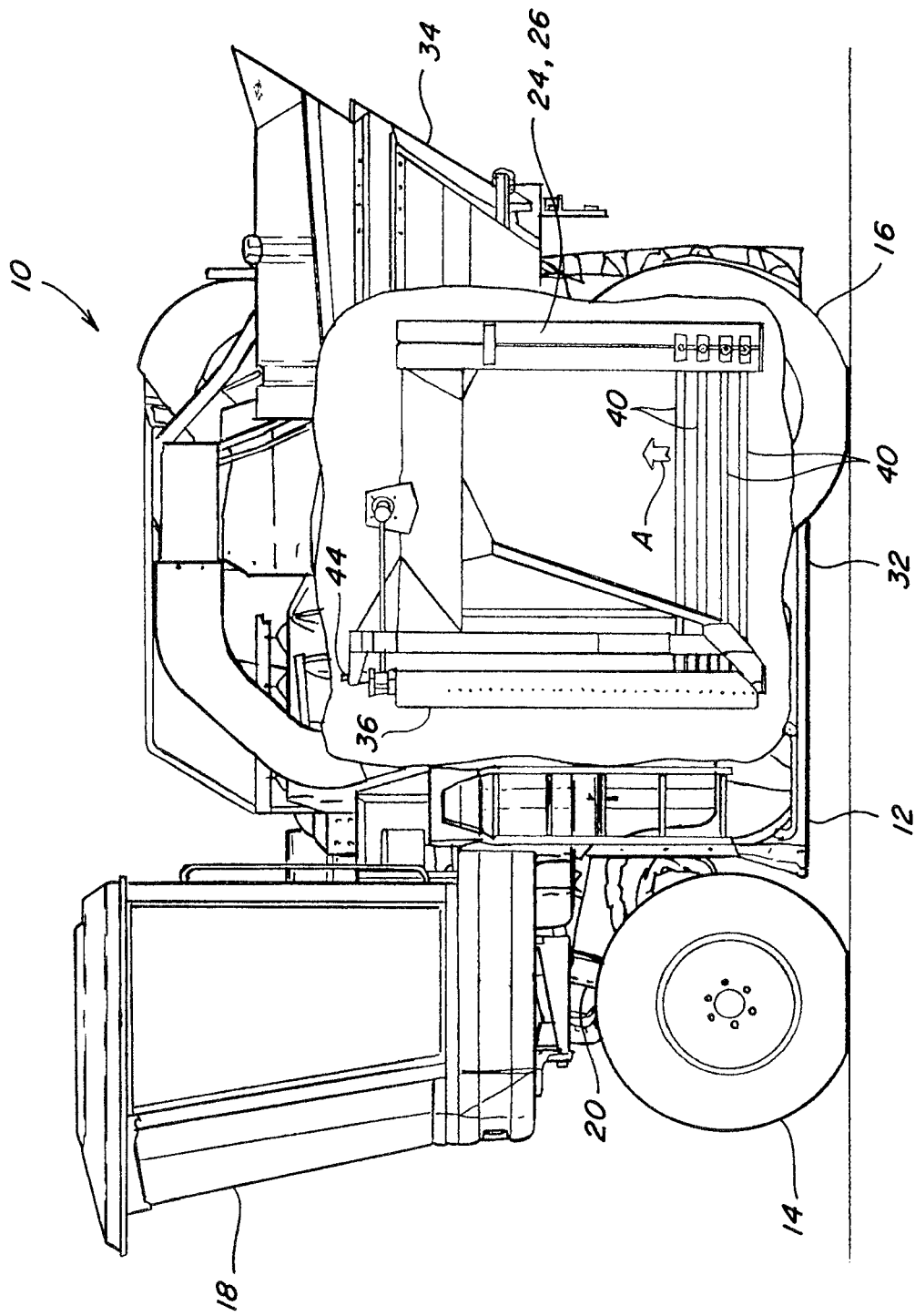
FIG. 2 is an enlarged side view of the harvester of FIG. 1.

Referring now to the drawings, in FIGS. 1 and 2, a representative fruit harvester 10, as more particularly described and illustrated in Mérant U.S. Pat. No. 6,854,254, hereby incorporated herein in its entirety by reference, is shown. Generally, harvester 10 has a gantry type straddling frame 12 supported by fore and aft wheels 14 and 16, for movement over a surface, such as the ground. Harvester 10 is illustrated as a self-propelled machine, having an engine which provides motive power to wheels 14 and/or 16, for example, via pressurized fluid delivery to fluid motors (not shown) in connection with the wheels. Harvester 10 includes an operator cabin 18, and can also be configured for raising and lowering frame 12 relative to wheels 14 and 16, via articulating legs 20, or other suitable structure connecting frame 12 to wheels 14 and 16, such that frame 12 can stay level during movement over laterally sloped surfaces, and for adjusting the height of straddling frame 12 above the ground.

Straddling frame 12 is of well known construction, and is configured for straddling at least one row of crops, for example, a row of grape vines, or several rows of vines, represented in FIG. 1 by vines 22, for example, or two or three rows of vines if harvester 10 is used in close-planted vineyards. Straddling frame 12 carries or supports harvesting apparatus 24 configured and automatically operable for detaching grapes or bunches of grapes from the vines 22, as is known in the art.

Figure 3:
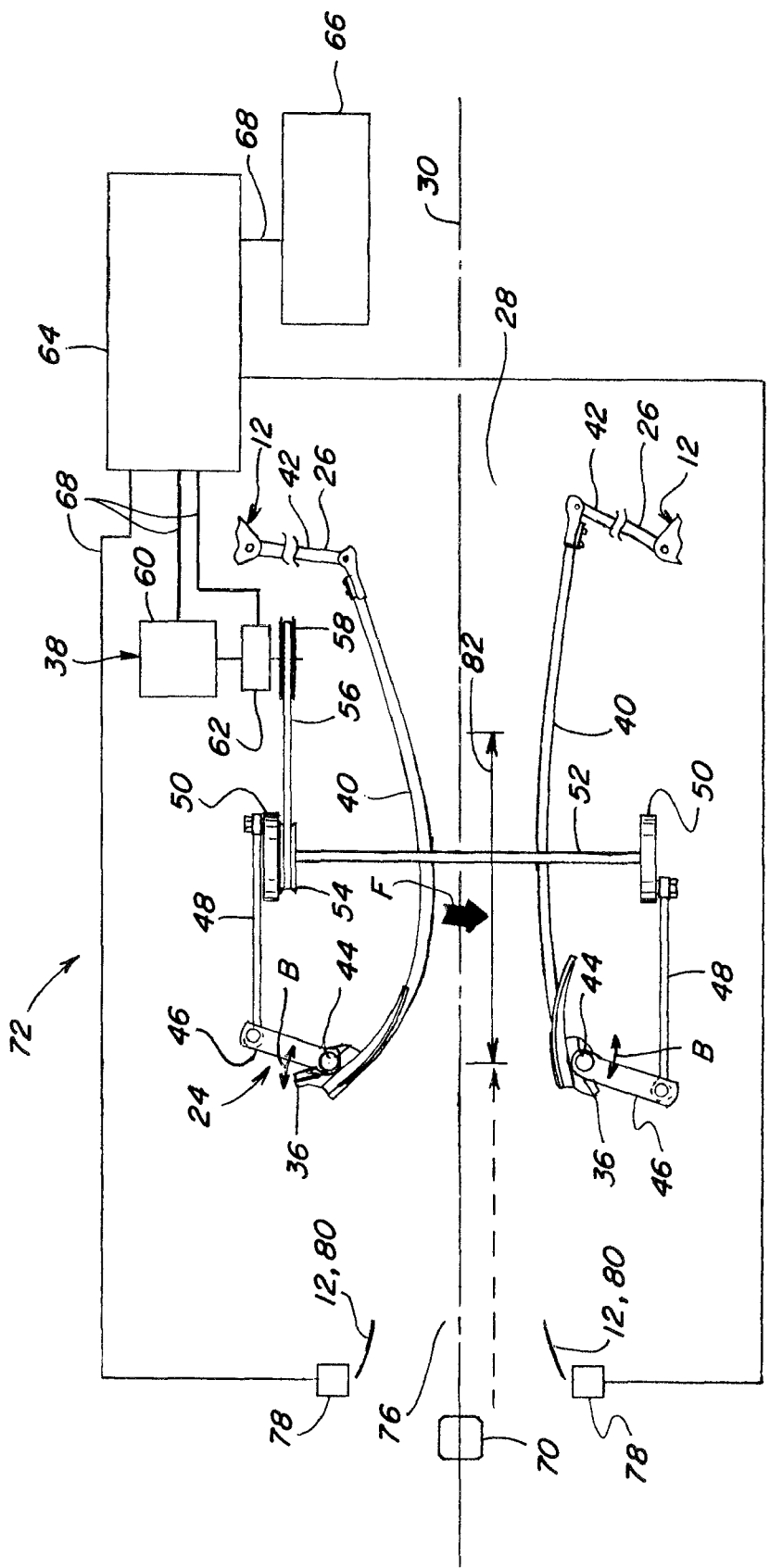
FIG. 3 is a simplified schematic representation of aspects of the system of the invention, showing entry of a sensed upstanding rigid object into a passage through harvesting apparatus of the harvester.
Figure 4:
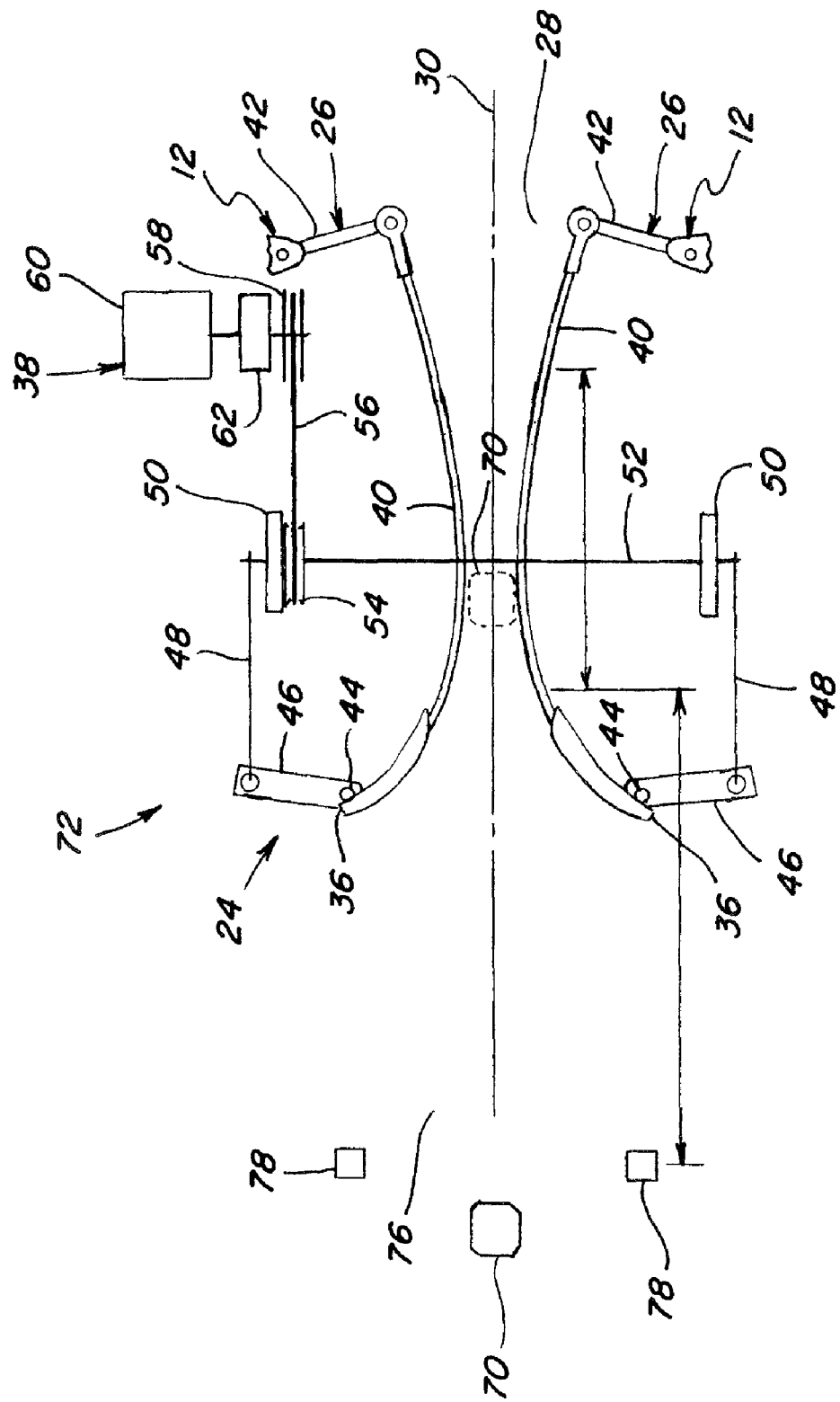
FIG. 4 is another simplified schematic representation of aspects of the system of the invention, showing the harvesting apparatus configured in a mode for passage about the rigid object while reducing forces exerted thereagainst.

Referring also to FIGS. 3 and 4, harvesting apparatus 24 includes two shaker assemblies 26 disposed on opposite sides, respectively, of a passage 28 through frame 12, defining a path between assemblies 26 and through frame 12, as denoted by a centerline 30. Shaker assemblies 26 are configured and operable, as will be explained, for exerting forces, denoted generally by arrow F in FIG. 3, against the fruit of plants such as vines 22 (FIG. 1), located in passage 28, so as to detach the fruit and cause it to fall from the vines. In the instance of grapes, the grapes can be detached by this forceable movement in bunches and/or individually. The detached fruit will fall into receptacles of a conveyor 32 (FIGS. 1 and 2) of known construction and operation disposed adjacent to the bottom of the respective shaker assemblies 26 beside passage 28, and be carried to a hopper or hoppers 34 disposed on a rear portion of harvester 10.

As is known in the art, and explained in detail in U.S. Pat. No. 6,854,254, to generate the oscillating movements, each of the two shaker assemblies 26 includes an oscillating vertical plate 36 which, in operation, oscillates about a vertical axis of a vertical shaft 44 of the assembly to which it is affixed, under control of a drive 38. A plurality of shaker members 40 are, in turn, adjustably connected to each vertical plate 36, so as to be individually positionable at vertical positions therealong as most advantageous for the harvesting operation, as illustrated by arrow A in FIG. 2 and the positions of member 40 as shown in FIG. 1.

Here, each shaker member 40 preferably consists of a rod having a small cross section compared to its length and made from a flexible material such as a glass fiber-reinforced polyester resin or a polyamide, for example. For a grape harvesting application such as illustrated, rods having a circular section of approximately 30 mm diameter and a length of approximately 1.8 m, made from a polyamide, can be used. As is known in the art, each shaker member 40 can be solid or hollow (tubular), or it can have a composite structure with a core having the required flexibility characteristics covered with a wear resistant material different from the material of the core. In a relaxed or substantially unflexed state, each member 40 is substantially rectilinear. When each member is mounted in the harvesting apparatus 24, it extends horizontally lengthwise and curves or flexes into an arcuate shape, the convex side of which is oriented toward centerline 30, and the degree of flexure of which is controllable or settable. The front end of each member 40 is detachably coupled to one of the two oscillating vertical plates 36, and the rear end of each member 40 is connected to frame 12 or structure of the shaker assembly 26 by suitable structure, here, a link 42, such that oscillations of the respective plates 36 will result in alternating forceful flexure (top member 40 in FIG. 3) for exerting force F, and relaxation (bottom member 40).

Shaft 44 of each shaker assembly 26 is preferably supported so as to be rotatable about a longitudinal vertical axis therethrough which, as noted above, coincides with the vertical axis of oscillation of the oscillating vertical plate 36. Plate 36 and shaft 44 of each assembly 26 are connected for joint movement, such that back and forth rotation of shaft 44 about its vertical axis will effect the oscillating movement of plate 36. To accomplish this, each shaft 44 is rigidly fixed to a radial drive arm 46 of drive 38 so as to be rotatable in a back and forth manner thereby, as denoted by arrows B in FIG. 3. Drive 38 includes a crank arm 48 having one end pivotally connected to drive arm 46, and an opposite end rotatably connected by a pin to a cam 50 of the drive. The two cams 50 are joined for joint, timed rotation by a cross shaft 52 of the drive, such that plates 36 on the opposite sides of passage 28 will be oscillated in a phased relation, which here is preferably of about 180 degrees, by the rotation of cams 50, as illustrated by the different positions of members 40 in FIG. 3 (upper member 40 at about its greatest extent of flexure, lower member 40 at about its minimum extent of flexure or relaxed state). The timed, phased relationship of plates 36 results in alternating timed, forced flexure and relaxation of shaker members 40 on the opposite sides of passage 28, in a manner such that as shaker members 40 on one side of passage 28 are at about their maximum state of flexure so as to project their greatest extent toward centerline 30, shaker members 40 on the other side are at about their maximum state of relaxation so as to be at their greatest distance from the centerline.

To drive shaker members 40 in the above manner, drive 38 includes a sprocket or pulley 54 fixed to cross shaft 52, and which is connected by a transmission chain or belt 56 to another sprocket or pulley 58, connected in rotatably driven relation to a motive device 60 of drive 38, which can be, for example a hydraulic motor, electric motor, or a driveline to the engine of the harvester 10. A clutch 62 is shown disposed between motive device 60 and pulley 58, and is conventionally constructed and operable so as to be controllably operable in an engaged state for connecting device 60 in rotatably driving relation to pulley 58, and in a disengaged state for disconnecting device 60 and pulley 58. Clutch 62 can additionally optionally be operable in a partially engaged state to allow slipping between device 60 and pulley 58, if desired or required for a particular application.

It will typically be desired to operate shaker members 40 of harvesting apparatus 24 at a speed which corresponds to the speed of movement of harvester 10 in relation to the plants being harvested, with the objective of exerting sufficient forces F against the plants being harvested, e.g., vines 22 in FIG. 1, for effectively detaching and collecting the fruit with efficiency, yet minimal damage. To accomplish this, the speed of operation of motive device 60 will typically be controlled as a function of the speed of movement of the harvester. Referring more particularly to FIG. 3, this can be accomplished in any suitable desired manner, such as, but not limited to, using a processor based controller 64, in connection with a speed device 66, which can be for instance, a conventional element of the drivetrain operable for sensing or determining a speed of movement thereof, e.g., one or more of wheels 14, 16, or a driveshaft (not shown), or a conventional device operable for determining the speed of harvester 10 relative to the ground, and outputting signals representative thereof to controller 64. This can be, for instance, in a closed loop system wherein harvesting apparatus 24 is controlled as a function of one or more parameters, e.g., ground speed of harvester 10. Motive device 60, clutch 58 and speed device 66 can be connected to controller 64 by suitable conductive paths 68, such as wires of a wiring harness of harvester 10, for receiving power and/or command signals therefrom, and outputting signals thereto.

As noted above, and as illustrated in FIG. 1, particularly when harvesting grapes, upstanding rigid or essentially nonyielding objects may be dispersed along the path of movement of harvester 10, in this instance, posts 70, which support wires 72 that carry vines 22, so as to be necessarily straddled by frame 12 and harvesting apparatus 24, during the movement, and such that posts 70 may be forcibly contacted by shaker members 40. Some posts 70 are potentially damaging to shaker members 40, e.g., have abrasive weathered, pitted, and/or damaged surfaces, rough and/or damaged edges, etc., which can roughen, scratch or otherwise damage and wear the surfaces of members 40, which if so damaged, can also damage vines 22 and fruit carried thereby, which is obviously undesirable in most instances. Harvesting apparatus 24 can also damage the rigid objects. Damage to shaker members 40 has been found to be particularly problematic when the rigid objects are reinforced concrete posts, that is, those containing metal reinforcing wires or rods, and when shaker members 40 are repeated forcibly reciprocatingly moved or oscillated thereagainst.

Figure 5:
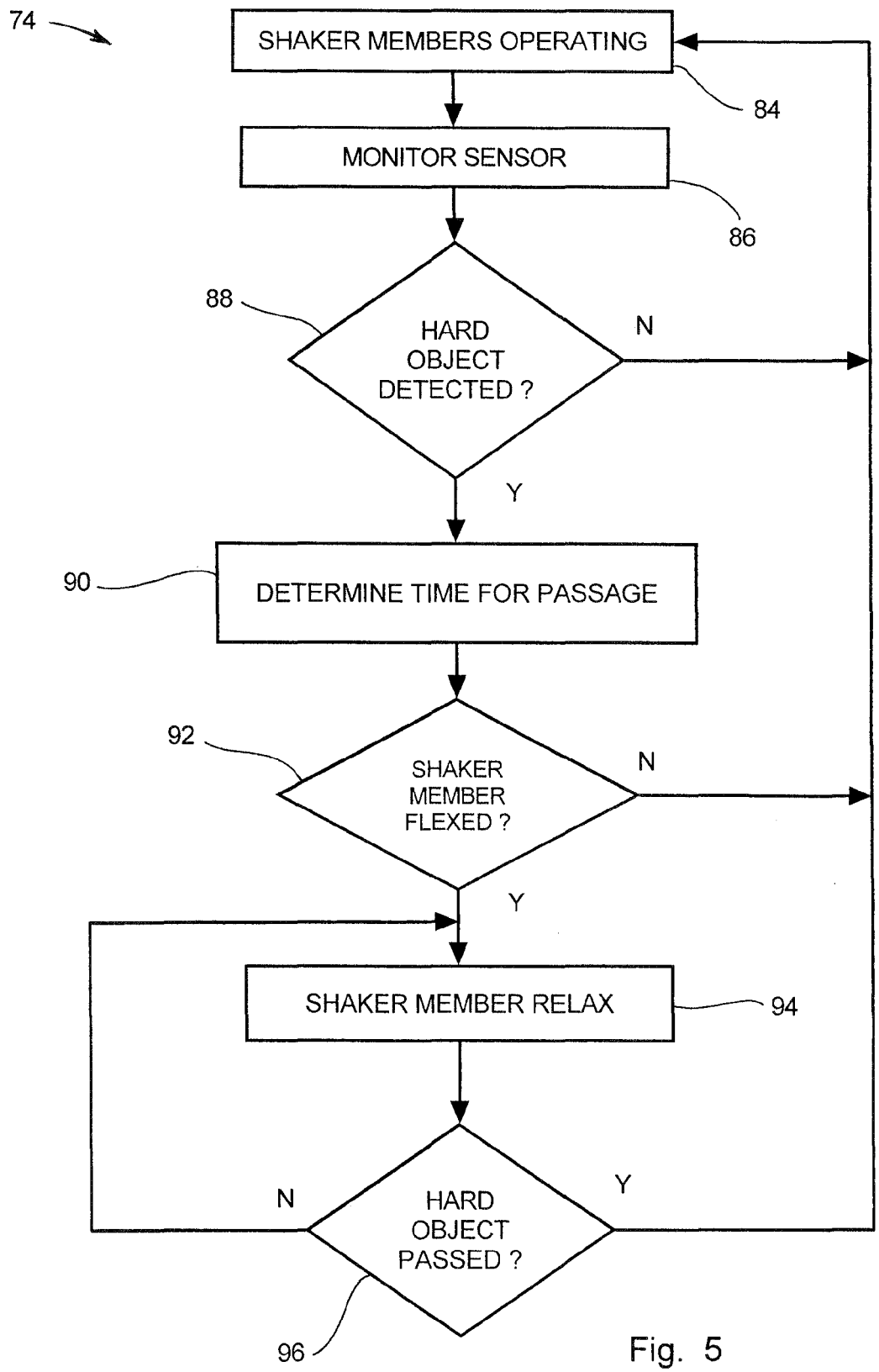
FIG. 5 is a high level flow diagram showing steps of one embodiment of a method of the invention.

Referring in particular to FIGS. 3 and 4, and also to FIG. 5, to overcome or significantly reduce the above problem, elements of harvester 10 are incorporated into a system 72 configured and operable according to a preferred method 74 of the invention, for detecting rigid upstanding objects, such as, but not limited to, posts 70, and reducing the forces exerted by harvesting apparatus 24, particularly, shaker members 40, thereagainst, while preferably minimizing any resultant disruption of the harvesting operation or reduction in yield. System 72 preferably utilizes at least one detector or sensor 78 configured and operable for sensing any upstanding rigid object, e.g., a post 70, entering, or about to enter, passage 28. This can be as the object is still located outwardly of an inlet opening 76 in connection with passage 28, or as it is located in inlet opening 76 or an initial portion or region of passage 28, but preferably before being contacted in a significantly forceful, e.g., shaking, manner by elements of harvesting apparatus 24, and particularly shaker member or members 40. Here, two sensors 78 are utilized, which will be supported in a suitable manner on harvester 10, such as on leading portions of frame 12 on opposite sides of inlet opening 76, which leading portions can include, for instance, upstanding sheets or plates 80 supported on a forward region of frame 12 and which taper convergingly toward centerline 30, which plates 80 are provided for guiding and gradually sidewardly or laterally compressing plants entering passage 28 as they are straddled by frame 12, in the well known manner. Alternatively, suitable support brackets (not shown) can be mounted on harvester 10 to support a sensor or sensors 78 at a suitable forward location for providing the desired sensing capability.

As examples of suitable sensors 78, sensors or metal detectors capable of sensing or detecting proximity of metal objects have been found to be good for applications wherein the rigid objects comprise metal, such as metal posts or metal reinforced posts. And, non-metallic standing objects can have metal applied thereto, e.g., foil, sheet, nails, or the like, so as to be distinguishable from other objects, such as the trunks of vines or other plants being harvested.

Here, it should be noted that other manners of sensing and distinguishing certain upstanding objects from trunks of plants to be harvested, can be devised, such as by using sonic sensors, imaging devices, or combinations or arrays of sensors, in combination with programming methods to determine the timing of responsive operation of harvesting apparatus 24, and/or drive 38.

Responsive to the sensing of entry of a rigid upstanding object, e.g., a post 70, into passage 28, system 72 of the invention will preferably reduce or alter the movements of the at least one movable member, e.g., shaker members 40, when the object is at a location within passage 28 adjacent to a predetermined portion of the movable members, here, which is preferably a medial portion thereof subject to maximum flexure and exertion of force F, denoted in FIG. 3 as a region of maximum flexure 82, to substantially reduce occurrence of exertion of potentially damaging forces against the object, and thus substantially reduce or minimize the potential for damage to the movable member or members (e.g., shaker members 40), and the hard object (post 70). Such reductions or alterations of the movements can comprise, for instance, altering the connection of drive 38 to shaker members 40, e.g., disengaging or slipping of clutch 62, to allow shaker members 40 on opposite sides of passage 28 to move to semi-flexed states, such as illustrated in FIG. 4, sufficiently spaced apart to allow passage of a rigid object such as a post 70 therebetween, with minimal contact therewith, and without the normal forceable contact, as would otherwise occur without the disengagement or slippage of the clutch. With disengagement of clutch 62, momentum of shaker members 40 can be dissipated, such that contact with the rigid object can push the shaker members away from the center of the passage, for passage therebetween. Alternatively, drive 38 can be operated, such as reversing or increasing speed, idling, e.g., destroking fluid motor, or the like, to allow shaker members 40 to compliantly move to a position such as shown in FIG. 4, at the appropriate time for passage about the sensed object, with minimal forces exerted thereagainst, minimal interruption or reduction of harvest yields, and minimal crop damage. As still another alternative, sides of straddling frame 12 and/or harvesting apparatus 24 can be constructed so as to be capable of temporarily spreading apart, to allow freer passage of a rigid object such as a post therethrough.

Here, it should be noted that the distance from sensor or sensors 78 to region of maximum flexure 82 will be known, and thus the time for passage of a hard object to and through region 82 can be determined by controller 64, such that control of drive 38 in the above described manner for reducing forces exerted against the hard object will be executed at the appropriate time. The positions of shaker members 40 in their oscillating motions can also be sensed or determined, such as by use of a suitable position sensor, switch, counter, or the like.

Referring more particularly to FIG. 5, steps of preferred method 74 of the invention are illustrated. As the shaker members 40 are operating, as denoted at block 84, signals from sensors 78 are monitored by controller 64, as denoted by block 86. If no standing hard structure or object is detected, as denoted at block 88, controller 64 will loop though the steps of blocks 84-88. If, at block 88, a standing hard object is detected, controller 64 will determine a time for passage of region 82 thereabout, as denoted at block 90. Controller 64 will then monitor the state of flexure of the shaker members, as denoted at block 92. If it is determined that the shaker members will not be, or are not, flexed too much at the time of passage, controller will return to block 84. If the shaker members will be, or are, more than desirably flexed during passage about the hard object, the members will be relaxed, in the above described manner, e.g., clutch 62 slipped or disengaged, to allow passage about the hard object with minimal force applied thereagainst, as denoted by block 94. Then, when the time for passage about the hard object has expired, as denoted by the loop through blocks 94 and 96, the shaker members will return to normal operation (block 84).

Here, it should be noted that the location of a standing hard object, such as, but not limited to a post 70, or the pending time until it will be straddled by shaker members, can be determined as a function of the distance between the sensor or sensors 78 and the leading portion of the shaker members, and signal changes resulting from the sensor or sensors moving toward then away from the sensed object, which determination can be performed by controller 64.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A fruit harvester, comprising:
a movable frame;

harvesting apparatus supported on the frame for movement therewith and configured for straddling fruit bearing plants, the harvesting apparatus including at least one flexing member disposed so as to be located beside the fruit bearing plants straddled by the harvesting apparatus, and a drive supported on the frame and controllably operable and configured for drivingly moving the at least one movable member relative to the frame for exerting forces against the plants straddled by the harvesting apparatus for releasing at least some of the fruit therefrom;

a sensor supported on the frame and configured so as to automatically sense presence of an upstanding rigid object when about to be or when initially straddled by the harvesting apparatus, and in cooperation with the drive to responsively automatically cause a change in the movement of the flexing member in a manner so as to reduce any forces exerted thereby only as the rigid object is straddled by a predetermined portion of the harvesting apparatus, wherein the predetermined portion of the harvesting apparatus includes a region of maximum flexure of the flexing member; and a controller connected to the sensor and the drive, and a speed device connected to the controller and operable for determining a speed of movement of the frame, wherein the controller configured to calculate the time period for the object to travel the distance from the sensor to the region of maximum flexure based on the speed of movement of the frame, the controller being configured and operable for altering the operation of the drive for reducing the forces exerted by the flexing member responsive to the sensing of the presence of the rigid object for a period of time sufficient for movement of the region of maximum flexure of the flexing member past the object.

2. The harvester of claim 1, wherein the at least one flexing member comprises a flexible rod, the movement thereof comprises forcibly flexing the rod, and the change in the movement comprises relaxing the rod.

3. The harvester of claim 1, wherein the movement comprises an oscillating movement, and the change in the movement comprises reducing the oscillating movement.

4. The harvester of claim 3, wherein the change in the movement comprises reducing an amplitude of the oscillating movement.

5. The harvester of claim 1, wherein the change in the movement comprises reducing the force of the movement.

6. The harvester of claim 1, wherein the drive includes a clutch connecting a motive device of the drive in driving relation to the at least one member, and the operation of the drive is altered by causing the clutch to disengage or slip.

7. The harvester of claim 1, wherein the sensor comprises a metal detector.

8. The harvester of claim 1, wherein the harvesting apparatus defines a passage therethrough including an inlet opening configured for receiving at least a portion of a row of the fruit bearing plants with the frame in straddling relation thereto, the at least one member is disposed on the harvesting apparatus adjacent to a side of the passage, and the sensor is disposed adjacent to the inlet opening.

9. An automatic fruit harvesting system with a standing rigid object sensing capability, comprising:
a frame configured for movement along a path;
harvesting apparatus supported on the frame for movement therewith along the path while straddling at least one fruit bearing plant on the path, the harvesting apparatus including at least one shaker member and a drive configured and operable for forcibly moving the at least one shaker member against the at least one fruit bearing plant when straddled by the harvesting apparatus for releasing at least some of the fruit therefrom;

sensor apparatus configured to automatically sense presence of a standing rigid object on the path prior to the at least one shaker member being forcibly moved thereagainst, and to cause the drive to automatically reduce the forcible movements of the at least one shaker member only as a predetermined portion of the shaker member passes the rigid object; and a controller connected to the sensor and the drive, and a seed device connected to the controller and operable for determining a speed of movement of the frame, wherein the controller configured to calculate the time period for the object to travel the distance from the sensor to the predetermined portion based on the speed of movement of the frame, the controller being configured and operable for altering the operation of the drive for reducing the forces exerted by the shaker member responsive to the sensing of the presence of the rigid object for a period of time sufficient for movement of the predetermined portion of the shaker member past the object.

10. The system of claim 9, wherein the at least one shaker member comprises a flexible rod, and the forcible movement thereof comprises forcibly flexing the rod.

11. The system of claim 9, wherein the forcible movement comprises an oscillating movement, and the reduction thereof comprises reducing an amplitude of the oscillating movement.

12. The system of claim 9, wherein the forcible movement comprises an oscillating movement, and the reduction thereof comprises reducing the force of the oscillating movement.

13. The system of claim 9, wherein the drive includes a clutch connecting a motive device of the drive in driving relation to the at least one shaker member, and the forcible movements are reduced by causing the clutch to disengage or slip.

14. The system of claim 9, wherein the sensor apparatus comprises a metal detector.

15. The system of claim 9, wherein the harvesting apparatus defines a passage therethrough including an inlet opening configured for receiving at least a portion of a row of the fruit bearing plants located along the path with the frame in straddling relation thereto, the at least one shaker member is disposed on the harvesting apparatus adjacent to a side of the passage, and the sensor apparatus is disposed adjacent to the inlet opening.

16. The system of claim 15, comprising two of the sensor apparatus disposed on the harvesting apparatus on opposite sides of the inlet opening, respectively.

17. A method of harvesting fruit, comprising steps of:
providing an automatic harvesting machine having a frame supporting at least one shaker assembly disposed beside and defining a passage configured for successively receiving a row of fruit bearing plants, and at least one drive connected in driving relation to the at least one shaker assembly and automatically operable for oscillating the shaker assembly for exerting forces against objects located at a predetermined portion of the shaker assembly within the passage and contacting the shaker assembly, including the fruit bearing plants received within the passage for detaching at least some of the fruit therefrom;
providing at least one sensor in connection with the frame and operable for sensing entry of a standing rigid object into the passage; providing a controller connected to the sensor and the drive, and a speed device connected to the controller and operable for determining a speed of movement of the frame, wherein the controller configured to calculate the time period for the object to travel the distance from the sensor to the predetermined region of the shaker assembly based on the speed of movement of the frame, the controller being configured and operable for altering the operation of the drive for reducing the forces exerted by the shaker assembly responsive to the sensing of the presence of the rigid object for a period of time sufficient for movement of the predetermined region of the shaker assembly past the object; and responsive to the sensing of the entry of a standing rigid object into the passage and based on the calculated time of the controller, automatically reducing the oscillations of the at least one shaker assembly only when the rigid object is within the predetermined portion of the shaker assembly so as to reduce any forces exerted thereby against the rigid object, and automatically increasing the oscillations after the predetermined portion has passed the rigid object.

18. The method of claim 17, wherein the step of automatically reducing the oscillations comprises altering the connection of the drive to the shaker assembly to allow contact with the rigid object to push the shaker assembly sidewardly outwardly relative to the passage.

19. The method of claim 17, wherein the step of automatically reducing the oscillations comprises altering operation of the at least one drive to allow at least substantially free movement of the shaker assembly such that contact between the rigid object and the shaker assembly will move the shaker assembly sidewardly away from a center of the passage.

20. The method of claim 17, wherein the at least one shaker assembly comprises flexible shaker members on opposite sides of the passage which are oscillated in a phased relation generally horizontally, and the oscillations are reduced responsive to the sensing of entry of the rigid object.

21. The method of claim 17, wherein the drive comprises a clutch which is disengaged or slipped for reducing the oscillations.

22. The method of claim 17, wherein the sensor comprises at least one metal detector disposed adjacent to an inlet opening in connection with the passage.

* * * * *